United States Patent [19]

Yamazaki

[11] Patent Number: 4,740,049
[45] Date of Patent: Apr. 26, 1988

[54] TECHNIQUE FOR MEASURING A SINGLE MODE OPTICAL FIBER

[75] Inventor: Yoshinori Yamazaki, Sagamihara, Japan

[73] Assignee: Anritsu Electric Company Limited, Tokyo, Japan

[21] Appl. No.: 762,043

[22] Filed: Aug. 2, 1985

[30] Foreign Application Priority Data

Jul. 31, 1985 [JP] Japan .................. 60-139660

[51] Int. Cl.$^4$ .................................. G02B 6/24
[52] U.S. Cl. ....................... 350/96.15; 356/73.1; 356/364
[58] Field of Search ............. 350/96.15, 96.16, 96.18, 350/96.29, 96.30, 96.33, 320; 356/73.1, 364, 365, 367

[56] References Cited

U.S. PATENT DOCUMENTS

| | | | |
|---|---|---|---|
| 4,539,521 | 9/1985 | Matsumato | 250/231 R X |
| 4,560,246 | 12/1985 | Cotter | 350/96.16 |
| 4,584,470 | 4/1986 | Iizuka et al. | 250/231 R |

OTHER PUBLICATIONS

"Studies of Optical Time Domain Reflectormetry in a Single-Mode Fiber", Aoyama et al., Yokosuka Elec. Communication Lab., Nippon Telegraph Telegram Co., 6/25/1981.

*Primary Examiner*—Gene Wan
*Assistant Examiner*—James C. Lee
*Attorney, Agent, or Firm*—Frishauf, Holtz, Goodman & Woodward

[57] ABSTRACT

An optical directional coupling apparatus includes an optical directional coupling device for permitting light of a predetermined polarization direction to be emitted from a second port when it is received at a first port of the coupling device, and for permitting only a light component of a polarization direction at a given angle with respect to the first polarization direction to be emitted from a third port when light is received at the second port. A polarization maintaining single mode fiber, is coupled at one end to the second port and has a main axis set at a predetermined angle with respect to the first polarization direction, wherein an optical fiber to be measured is connected at one end to the other end of said polarization maintaining single mode fiber.

2 Claims, 2 Drawing Sheets

TECHNIQUE FOR MEASURING A SINGLE MODE OPTICAL FIBER

BACKGROUND OF THE INVENTION

This invention relates to an optical directional coupling arrangement and, more particularly, an optical directional coupling technique which is adapted to translate a linearly polarized mode into a substantially randomly polarized mode, through a polarization maintaining single mode fiber and then permitting the resultant mode to be incident to an optical fiber to be measured.

As a light measuring apparatus, for example, a light pulse testing apparatus is known which is adapted to measure a fault on an optical cable by measuring back-scattered light which is reflected back in the optical cable after its original incident light has fallen into the optical cable. Such an optical pulse testing apparatus uses an optical directional coupling apparatus as shown in FIG. 1. In FIG. 1, a light of the linearly polarized mode which has been incident to a first port 1 of an optical directional coupling device 6 from, for example, a laser diode (not shown), is sent through a polarizing element (for example, a polarizing prism), a second port 3 of the optical directional coupling device 6 and a polarization maintaining single mode fiber 4 to an optical fiber 5. The optical directional coupling device 6 is comprised of the first port 1, the polarizing prism 2, the second port 3 and a third port 12. The optical directional coupling device 6 and the polarization maintaining single mode fiber 4 constitute an optical directional coupling apparatus 9. A light fiber 7 indicates a light fiber which introduces light which is reflected back as back-scattered light into a light receiver (not shown) and an optical connector 11 is provided.

The light of the linearly polarized mode which has been incident to the first port 1 is sent to the optical fiber 5 through the optical directional coupling apparatus 9. When the optical fiber 5 is of a multimode type, the light of the linearly polarized mode which is sent to the optical fiber 5 has its linear polarization characteristic readily cancelled due to the characteristic of the optical fiber and, at the same time, the light which is reflected back as back-scattered light has its linear polarization characteristic also cancelled, thus making substantially constant the polarization direction components of the back-scattered light which are branched through the polarizing prism 2 of the optical directional coupling device 6 and which are conducted to the third port 12. When, on the other hand, the optical fiber 5 is of a single-mode type, the above-mentioned light has its linear polarization characteristic substantially unaffected, unlike the case of the multi-mode optical fiber, due to the characteristic of the optical fiber and the back-scattered light which is reflected back in the optical fiber 5 with its linear polarization characteristic also substantially unaffected. In practice, however, the linearly polarized mode is translated into an elliptically polarized mode, depending upon the length of the optical fiber 5, a stress inflicted upon the optical fiber 5, and elliptic deformation, anistropy, heat, etc., and thus the vertically polarized component X of the elliptically polarized mode as shown in FIG. 2 is branched through the polarization prism 2 of the optical directional coupling device 6 and conducted to the third port 12. Whether the major axis of the ellipse pattern of the elliptically polarized mode is inclined in any particular direction anywhere along the length of the optical fiber, or whether the major axis of the ellipse pattern of the back-scattered light as mentioned above is inclined in any particular direction, is not determined and the back-scattered light which has been received at the light receiving unit has its light receiving level varied along the length of the optical fiber, causing it to waver in a zig-zag fashion and thus posing an undesirable problem from the standpoint of measurement.

SUMMARY OF THE INVENTION

It is, therefore, an object of this invention to provide a new and improved optical directional coupling technique, whereby it is possible to stabilize the receiving level of back-scattered light which has been introduced into a light receiving means through the optical fiber. According to this invention, an optical directional coupling technique includes the steps of emitting a linearly polarized light beam from a second port of an optical directional coupling device when a light beam is permitted to be incident on a first port of the device, permitting the linearly polarized beam from the second port to be incident on a to-be-measured optical fiber, after passing the light beam through at least one polarization-maintaining fiber, permitting backscattering light beams of the fiber to be measured to be incident on the second port of the device thereby emitting, from a third port, only those backscattering beams that are inclined at a predetermined angle with respect to the linearly polarized beam, observing a measurement curve relating to the backscattering beams from the third port of the device, and rotating and fixing the polarization-maintaining fiber so that a main axis of the surface of the fiber receiving the linearly polarized light beam is located at a position where the measurement curve is smoothest, thereby permitting randomly polarized light beams to be incident on the to-be-measured optical fiber.

BRIEF DESCRIPTION OF THE DRAWINGS

These and other objects and features of this invention can be understood by reference to the accompanying drawings in which.

DETAILED DESCRIPTION OF THE PREFERRED EMBODIMENTS

One embodiment of this invention will be explained below by referring to FIGS. 4 and 5 jointly.

Figure 1:
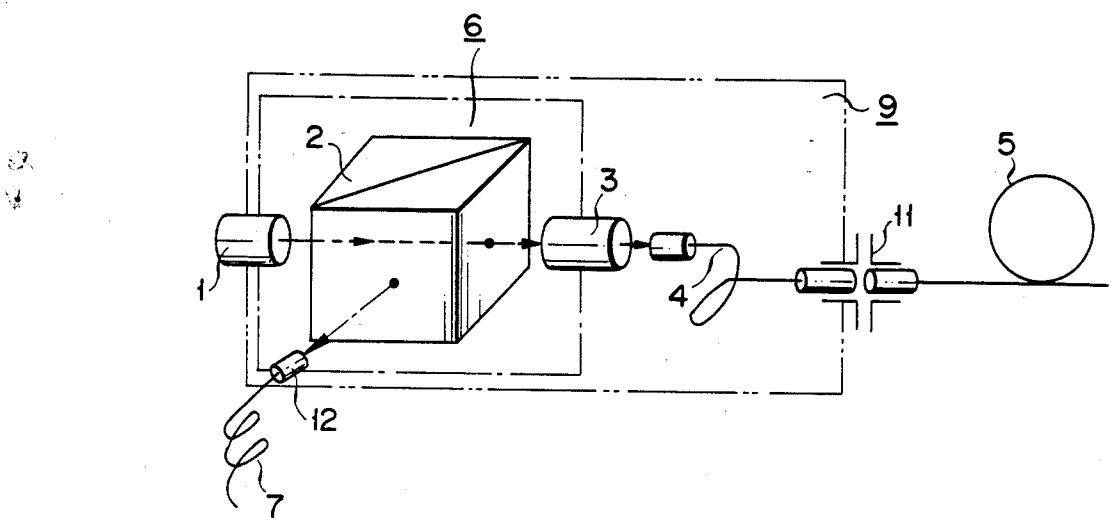
FIG. 1 is a diagrammatic view showing an arrangement of a conventional optical directional coupling apparatus.
Figure 2:
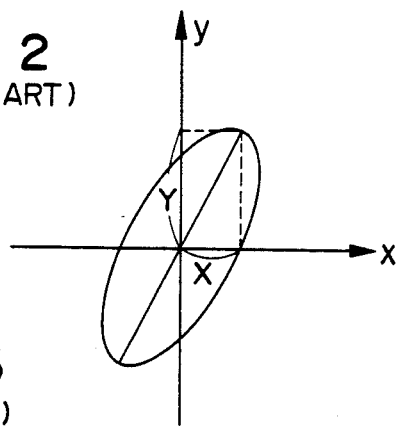
FIG. 2 is a view for explaining the occurrence of a wavering phenomenon in a zig-zag fashion on the measurement curve of back-scattered light.
Figure 3:
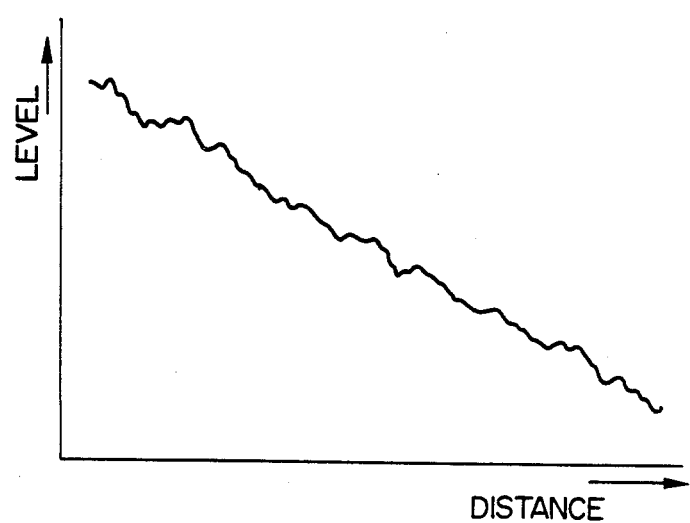
FIG. 3 is one example of a measurement curve of the back-scattered light when a single-mode optical fiber is measured by the conventional optical directional coupling apparatus.
Figure 4:
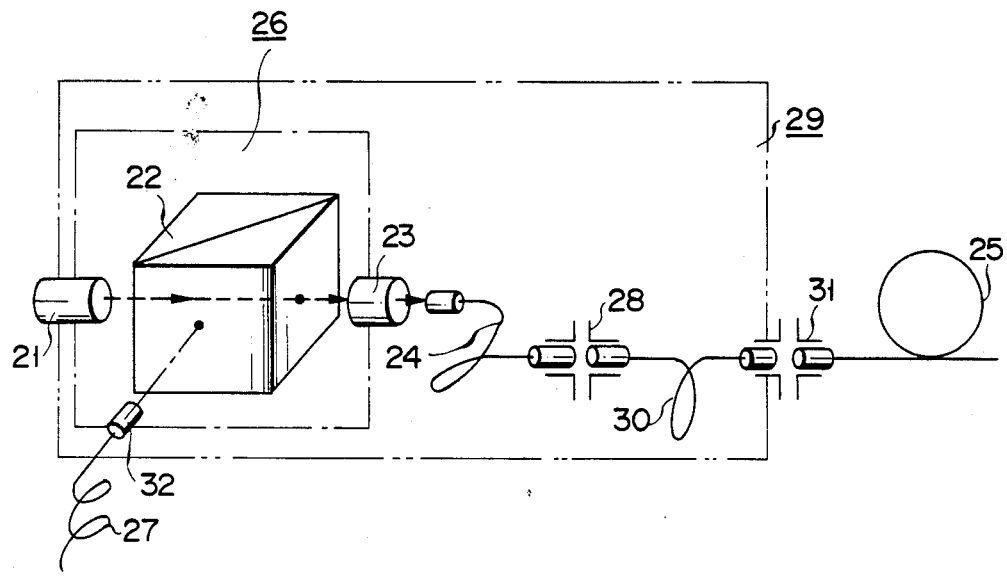
FIG. 4 is a diagrammatic view showing an arrangement of an optical directional coupling apparatus implement to one embodiment of this invention.
Figure 5:
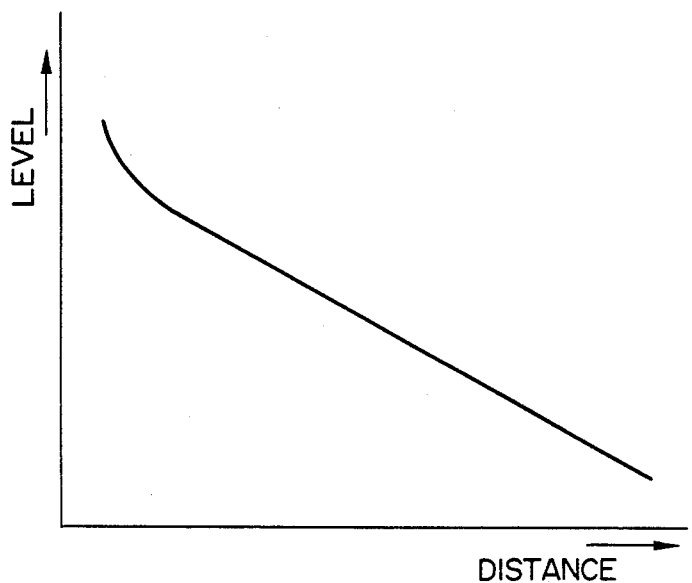
FIG. 5 shows one example of the measurement curve of back-scattered light when a single-mode optical fiber is measured by the optical directional coupling technique of this invention.

FIG. 4 is a diagrammatic view showing an optical directional coupling apparatus implement to one embodiment of this invention and FIG. 5 is one example of a measurement curve of back-scattered light when a single-mode optical fiber is measured by the optical directional coupling apparatus. In FIG. 4, a light of the linearly polarized mode which has fallen into a first port 21 of an optical directional coupling device 26 through, for example, a laser diode (not shown) is emitted into the optical fiber 25 through a polarization element 22 (for example, a polarizing element), a second port 23 and first and second polarization maintaining single mode fibers 24 and 30. The optical directional coupling device 26 is comprised of the first port 21, polarizing prism 22, second port 23 and third port 32. A SELFOC optical lens (graded index optical lens) may be used for the first and second ports 21 and 23.

An optical directional coupling apparatus 29 comprises the optical directional coupling device 26 and first and second polarization maintaining single mode fibers 24 and 30. A light fiber 27 introduces a light which is reflected back as back-scattered light into a light receiver (not shown) and an optical connector 31 is provided for connecting an optical fiber to be measured. Between the optical connector 31, connected to the optical fiber 25, and the optical connector 28, attached through the first polarization maintaining single mode fiber 24 to the second port 23 of the optical directional coupling device 26, is connected the second polarization maintaining single mode fiber 30 whose main axis is made at a predetermined angle with respect to the polarization direction as set out above.

In the optical directional coupling technique of this invention, therefore, light is emitted from the optical directional coupling device 26 through the second polarization maintaining single mode fiber 30 into the optical fiber 25 (a single mode optical fiber), noting that light enters into the optical fiber 25 after being substantially randomly polarized when it is emitted from the second polarization maintaining single mode fiber 30. For example, a light of the linearly polarized mode enters from a laser oscillator such as a laser diode (not shown) and into the first port 21 and comes to the first polarization maintaining single mode fiber 24 with the linear polarization retained. When the light is emitted into the second polarization maintaining single mode fiber 30, it is substantially randomly polarized, i.e., translated from the linearly because the first polarization maintaining single mode fiber 24 is adjusted at the connection part of the optical connector 28 with the main axis of the second polarization fiber 30 made at a predetermined angle with respect to the axis of the first polarization maintaining single mode fiber 24. In this way, it has been possible to suppress a wavering phenomenon which has been encountered in the measurement of a single mode optical fiber (see FIG. 5). This is probably because the a randomly polarized mode enters into the optical fiber 25.

According to this invention, the second polarization maintaining single mode fiber 30 is rotated relative to the first polarization maintaining single mode fiber so that their axes are rotated through a proper angle. Wherein, the measurement curve of the back-scattered light becomes smoother during the measurement of the single-mode optical fiber as shown in FIG. 5, thereby suppressing the wavering phenomenon which was encountered in the prior art apparatus. It is believed that, in this way, a substantially randomly polarized mode is emitted through the optical connector 31 into the optical fiber 25 to be measured. It is also believed that the back-scattered light which is reflected back in the optical fiber 25 is a, substantially randomly polarized mode. The optical directional coupling device 26 conducts into the third port 32 only that light component which comes from the second port 23 in the polarization direction corresponding to a predetermined angle. The back-scattered light is branched by the optical directional coupling device 26 and received into the light receiver through the light fiber 27. Since the back-scattered light so received is presumed to be circularly or elliptically rotated at a cycle much faster than an electric response speed of the light receiver, it is considered from the electrical viewpoint that the polarized light is disturbed in a random fashion. It is believed that the component branched into the third port 32 and the component traveling straight toward the first port 21 are distributed at the optical directional coupling device 26 in a substantially one-to-one correspondence.

In actual practice it is only necessary that the main axis of the second polarization maintaining single mode fiber 30, while viewing the measurement curve of the back-scattered light from the optical fiber 25, be rotated relative to the axis of the first polarization maintaining single mode fiber 24 and be fixed in a position where the measurement curve of the back-scattered light comes to its smoothest state. In this case, it is believed that the linearly polarized mode emitted from the first polarization maintaining single mode fiber 24 to the second polarization maintaining single mode fiber 30 is translated into a, substantially randomly polarized mode free from the linearly polarized component, when the linearly polarized mode is sent to the optical fiber 25.

The second polarization maintaining single mode fiber 30 is connected, for example, by a fusing method to the first polarization maintaining single mode fiber 24 without an optical connector 28.

Although the second polarization maintaining single mode fiber 30 has been explained as being connected between the first polarization maintaining single mode fiber 24 and the optical connector 31, it may be possible that the second polarization maintaining single mode fiber 30 be connected to the second port 23 of the optical directional coupling device 26, without using the first polarization maintaining single mode fiber 24, so that, when the linearly polarized mode is emitted from the second port 23, it enters into the second polarization maintaining single mode fiber 30 in a, substantially randomly polarized fashion. This is because the first polarization retaining fiber 24 merely serves to permit the linearly polarized mode which is emitted from the second port 23 of the optical directional coupling device 26 to be transmitted as such. It is better to provide the first polarization maintaining single mode fiber 24 from the standpoint of the assembly of the optical directional coupling device 26 as well as from the standpoint of adjustment.

This invention is based on the following principle.

Now suppose that the optical axis of the second polarization maintaining single mode fiber 30 is so connected to the first polarization maintaining single mode fiber 24 as to be inclined at an angle $\theta$ with respect to the optical axis of the first polarization maintaining single mode fiber 24. It is believed that, since the linearly polarized mode which is emitted from the first polarization maintaining single mode fiber 24 or the second port 23 is inclined at an angle $\theta$ with respect to the main axis of the second polarization fiber 30, the polarization planes of the amplitudes $a \cos \theta$ and $a \sin \theta$ of the light mode in the second polarization maintaining single mode fiber 30, having a as the amplitude of the light mode, are retained.

When the light mode is emitted from the second polarization maintaining single mode fiber 30, these are synthesized to produce an elliptically polarized mode:

$$\frac{x^2}{(a\cos\theta)^2} + \frac{y^2}{(a\sin\theta)^2} - \frac{2xy\cos\delta}{a^2\sin\theta\cos\theta} = \sin^2\delta \quad (1)$$

where
$\delta$: the phase difference between two components resulting from the length of the second polarization maintaining single mode fiber 30.

In order to obtain the requirements of a circularly polarized mode as given below, $$x^2 + y^2 = a^2/2 \quad (2)$$

it is required that $\theta = \pi/4$ and $\delta = \pi/2$. It is nearly impossible from the manufacturing viewpoint that the second polarization maintaining single mode fiber 30 is cut so as to obtain the phase difference of $\pi/2$. This is because it is necessary that the second polarization maintaining single mode fiber 30 be cut on the order of the wavelength of the light mode to obtain:

$$\delta = \pi/2$$

Here it is proved valid to permit a substantially randomly polarized mode to enter into the single-mode optical fiber.

In the optical directional coupling technique of this invention, the polarization maintaining single mode fiber having a main axis made at a predetermined angle with respect to the polarization direction is connected between the optical directional coupling device and the optical fiber to be measured and, while viewing the measurement of the back-scattered light, the polarization plane of the linearly polarized mode is displaced relative to the main axis of the polarization maintaining single mode fiber. By this simpler operation, a substantially randomly polarized mode enters into the single-mode optical fiber to stabilize the receiving level of the back-scattered light which enters the light receptor fiber.

What is claimed is:

1. A method of measuring a single mode optical fiber, comprising the steps of:

permitting a light beam to be incident on a first port of an optical directional coupling device, thereby emitting a linearly polarized light beam from a second port of the optical directional coupling device;

permitting the linearly polarized light beam, emitted from the second port, to be incident on a to-be-measured optical fiber, after passing the light beam through at least one polarization-maintaining fiber;

permitting backscattering light beams of the to-be-measured fiber to be incident on the second port of the optical directional coupling device, thereby emitting, from a third port of the optical directional coupling device, only those backscattering light beams that are inclined at a predetermined angle with respect to the linearly polarized light beam;

observing a measurement curve relating to the backscattering light beams emitted from the third port of the optical directional coupling device; and rotating and fixing the polarization-maintaining fiber such that a main axis of that surface of the polarization-maintaining fiber which receives the linearly polarized light beam is located at a position where the measurement curve is observed to be smoothest, thereby permitting substantially randomly polarized light beams to be incident on the to-be-measured optical fiber.

2. A method according to claim 1, including forming the polarization-maintaining fiber by coupling first and second polarization-maintaining fiber elements to each other with an optical connector, and rotating and fixing the polarization-maintaining fiber by moving the first and the second polarization-maintaining fiber elements relative to each other at a connection part of the optical connector.

* * * * *

UNITED STATES PATENT AND TRADEMARK OFFICE
CERTIFICATE OF CORRECTION

PATENT NO. : 4,740,049
DATED : April 26, 1988
INVENTOR(S) : YAMAZAKI

It is certified that error appears in the above-identified patent and that said Letters Patent is hereby corrected as shown below:

Title page, left-hand column, Assignee, "Anritsu Electric Company Limited" should be deleted, insert -- Anritsu Corporation --

Delete "Foreign Application Priority Date Jul. 31, 1985 (JP) Japan...............60-139660"

Signed and Sealed this

Thirty-first Day of January, 1989

Attest:

DONALD J. QUIGG

Attesting Officer

Commissioner of Patents and Trademarks